United States Patent [19]

Hanchar et al.

[11] Patent Number: 5,477,703
[45] Date of Patent: Dec. 26, 1995

[54] GEOTHERMAL CELL AND RECOVERY SYSTEM

[76] Inventors: Peter Hanchar, 88 Montgomery Rd., Scottdale, Pa. 15683; Harry J. Hanchar, 812 Forest Ave., Belleforte, Pa. 16823

[21] Appl. No.: 222,234

[22] Filed: Apr. 4, 1994

[51] Int. Cl.⁶ ............................ F28D 7/12
[52] U.S. Cl. ........................... 62/260; 165/45
[58] Field of Search .................. 62/260, 238.6, 62/238.7; 165/45

[56] References Cited

U.S. PATENT DOCUMENTS

| | | | |
|---|---|---|---|
| 462,179 | 10/1891 | Turley et al. | 62/260 |
| 1,576,867 | 3/1926 | Swan | 62/260 |
| 2,181,953 | 12/1939 | Usselman | 62/1 |
| 2,563,262 | 8/1951 | Moore | 126/344 |
| 2,828,681 | 4/1958 | Smith | 98/1 |
| 3,194,303 | 7/1965 | Haried | 165/29 |
| 3,563,304 | 2/1971 | McGrath | 165/2 |
| 3,581,513 | 6/1971 | Cranmer et al. | 62/50 |
| 3,791,443 | 2/1974 | Burt et al. | 165/45 |
| 4,010,731 | 3/1977 | Harrison | 126/436 |
| 4,011,736 | 3/1977 | Harrison | 62/260 |
| 4,042,022 | 8/1977 | Perry et al. | 165/1 |
| 4,059,959 | 11/1977 | Matthews | 60/641 |
| 4,139,321 | 2/1979 | Werner | 405/154 |
| 4,142,576 | 3/1979 | Perry et al. | 165/45 |
| 4,286,574 | 9/1981 | Vrolyk et al. | 126/400 |
| 4,325,228 | 4/1982 | Wolf | 62/260 |
| 4,375,831 | 3/1983 | Downing | 62/260 X |
| 4,378,908 | 4/1983 | Wood | 237/2 B |
| 4,392,531 | 7/1983 | Ippolito | 166/278 |
| 4,452,227 | 6/1984 | Lowrey, III | 126/415 |
| 4,570,452 | 2/1986 | Bingham | 62/260 |
| 4,674,561 | 6/1987 | Kelley | 165/45 |
| 4,741,389 | 5/1988 | Smith | 165/45 |
| 4,753,285 | 6/1988 | Rawlings | 165/45 |

Primary Examiner—Henry A. Bennet
Assistant Examiner—William C. Doerrler
Attorney, Agent, or Firm—Gipple & Hale; John S. Hale

[57] ABSTRACT

An apparatus comprising a geothermal cell and recovery system comprising a heat exchange zone located in the earth and separated from the earth by an impermeable barrier. A housing containing a fluid pump and compressor is submersed in heat exchange zone and a fluid conduit return assembly is positioned in the bottom section of the heat exchange zone. A fluid discharge assembly receives fluid from the pump and is positioned in the top section of the heat exchange zone. An underground heat pipe extends through the heat exchange zone. Back-fill material is positioned around the underground heat pipe and the housing heat pump is connected to said underground heat pipe.

22 Claims, 6 Drawing Sheets

GEOTHERMAL CELL AND RECOVERY SYSTEM

BACKGROUND OF THE INVENTION

The present invention is directed towards a geothermal cell and recovery system.

The most common source of heating or cooling is the surrounding air because of its accessibility. However, since the air is heated to high temperatures in the summer and cold temperatures in the winter, it is the least efficient source of cooling and heating. The use of water as a heat source is more efficient than atmospheric air. However, the impurity, quality, quantity and disposal of water and the corrosion problems of pipes handling the water have minimized the use of such systems.

It has been established since at least the early 1900's that earth (be it soil, clay or stone) was a good insulator. This made it possible to store ice for long periods of time in pits as it is known that the temperature of the earth remains rather constant at as shallow a depth as 36 inches or in colder regions under the frost line.

There have been numerous attempts to recover or utilize heat from the earth. Some of the earlier recovery attempts used large numbers of refrigerant lines buried beneath the surface of the earth. Others developments required the drilling of numerous, and sometimes deep, water wells to develop a sufficient water supply. Still other developments used a brine solution with piping buried beneath the soil. These earlier attempts have major drawbacks which have prevented their success and curtailed development. Modern day home owners do not have sufficient land needed to bury a piping array underground and are precluded from such installation by zoning ordinances. Other home owners lack the certainty of hitting water of sufficient quantity to afford drilling a well or wells. Furthermore using a brine solution which is circulated in large piping arrays underground is undesirable because of the environmental problems which include potential possibility of contamination of the sub-soil and ground water and the large building lot size required. The prior art devices used were not as intrinsically safe, environmentally friendly, low in maintenance or low in energy consumption as the present recovery system.

A number of devices have been used in the prior art to recover or utilize heat from the earth. One such device is disclosed by U. S. Pat. No. 4,042,012 of Aug. 16, 1977 which shows the use of a heat pump in combination with a heat exchanger and heat sink. The heat sink uses back-fill soil enhanced with water sub-particles to transfer heat (cold) to buried heat pipes having coiled portions. The heat pipes are formed with a closed fluid circuit which runs through a heat exchanger which also contains a second closed conduit which communicates to with a heat pump.

In construction of the heat sink, a hole is dug in the ground, and a bottom water impermeable sheet of synthetic polymer material is laid to conform to the hole walls. A coiled heat pipe is laid in the interior of the hole and the soil previously removed is mixed with water absorbent particles with the mixture then being used to bury the pipe. A roof is placed on the upper surface of the back-fill soil soaked water absorbent particles. The remainder of the back-fill is placed over the roof.

Another U. S. Pat. No. 4,142,576 of Mar. 6, 1977, discloses a heat pump which is similarly connected with a heat exchanger. A pump located outside the heat sink pumps fluid through submerged coils which are placed in a pit having a fluid impermeable plastic wall. The pit is filed with back-fill soil and water soaked absorbent particles in random dispersion. The pump re-circulates the water through the coils and the heat exchanger to effect a heat transfer to a heat pump having a refrigerant line which runs through the heat exchanger.

Still another U.S. Pat. No. 4,452,227 of Jun. 5, 1984, discloses a pit with a plastic liner filled with gravel and rock. Brine is pumped from the pit into a spray tray exposed to outdoor air and returned into the pit. The brine is pumped out of the pit into a heat exchanger.

Another U.S. Pat. No. 4,010,731 of Mar. 8, 1977, discloses a heat storage pit with a water impermeable liner tank made of plastic such as vinyl or polyethylene. A layer of sand a few inches thick is spread on the bottom of the tank to prevent puncturing. Protection for the sides of the tank may be in the form of a layer of sand or alternatively, plastic or plastic foam. The tank is filled with gravel and stones of uniform size to provide void spaces. Earth taken from the pit is used for filling the tank after it has been screened to develop water circulation voids. Water is then pumped through the aggregate and an insulating barrier which extends down from the top of the tank traps the hottest water in the central portion while the coolest water flows under the barrier into the side portion. In the central portion, the warmest water rises to the top where its heat comes into contact with the heat exchanger for the purpose of providing hot water and heat to the house.

Conventional heat pump systems utilize a compressor, fan, condensing and evaporating coils, control valves, refrigerant gases and air in order to provide a source of cooling in summer and a source of heating in fall, winter and spring. The condensing coil, fan compressor and controls are known as the 'outdoor unit.' During operation, the outdoor unit either extracts heat from or releases heat to the ambient air depending upon the cycle used. This transfer of heat to or from the outdoor unit is accomplished by forcing air through the condenser coils by means of a fan.

While the conventional heat pump uses air as its primary transfer medium, the geothermal cell and its recovery system invention use a different approach. First, a thermal mass is achieved by the construction of the geothermal cell and filling it with clean water. Second, the recovery system utilizes a submersible pump, a submersible refrigerant compressor and a submersible coil to transfer heat to or from the geothermal cell. The water used in the geothermal cell is the primary transfer medium. Water within the geothermal cell has a specific heat of 1.0 btu/lb/F. and has a constant temperature (approximately 54° F.) as opposed to air which has a low specific heat (approximately 0.24 btu/lb/F. at sea level) and wide temperature variations (−10° F. to 11° F.). This range falls within heat pump and heat exchanger maximum efficiency ranges.

Water, having superior heat transfer characteristics as compared to air (800 times greater specific volume and four times greater specific heat) makes the geothermal cell and recovery system far more efficient then the conventional heat pump system.

SUMMARY OF THE INVENTION

In the present invention, the geothermal cell and recovery system is utilized for enhanced heat transfer. The geothermal cell comprises a heat exchange zone located in the earth and separated from the earth by an impermeable barrier filled with gravel providing voids for water circulation. The recovery system comprises a housing containing a fluid pump and compressor located in said heat exchange zone surrounded by the gravel with a fluid conduit return assembly connected to the housing positioned in the bottom section of the heat exchange zone. A fluid transportation means receiving fluid from said fluid pump positioned in the top section of the housing and discharges to fluid along the top of the heat exchange zone.

It is an object of the invention to provide a thermal mass to provide a novel water-earth heat transfer system.

Another object of the invention is to provide a novel heat exchange construction for extracting heat from the earth into a water filled, insulated heat sink to be cooled which operates with a minimum of moving parts and is economical and efficient to use.

Another object of the invention is to use the earth itself by laying a heat exchanger assembly in an underground hole which has been covered with an impermeable layer of plastic and back-filling the hole with crushed rock or gravel so that the heat exchanger assembly is covered with the crushed rock or gravel. The filled hole is then filled with liquid to increase heat transfer between the liquid and buried heat exchanger assembly.

In the accompanying drawings, there is shown an illustrative embodiment of the invention from which these and other of objectives, novel features and advantages will be readily apparent.

DETAILED DESCRIPTION OF THE INVENTION

Figure 1:
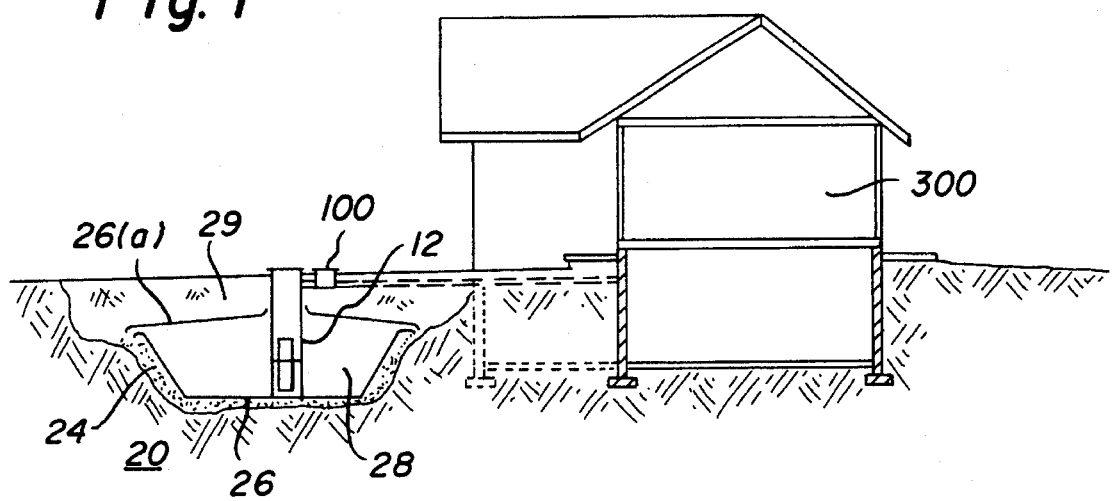
FIG. 1 is a schematic cross sectional view of the geothermal cell and recovery system of the present invention used to air condition a house.
Figure 2:
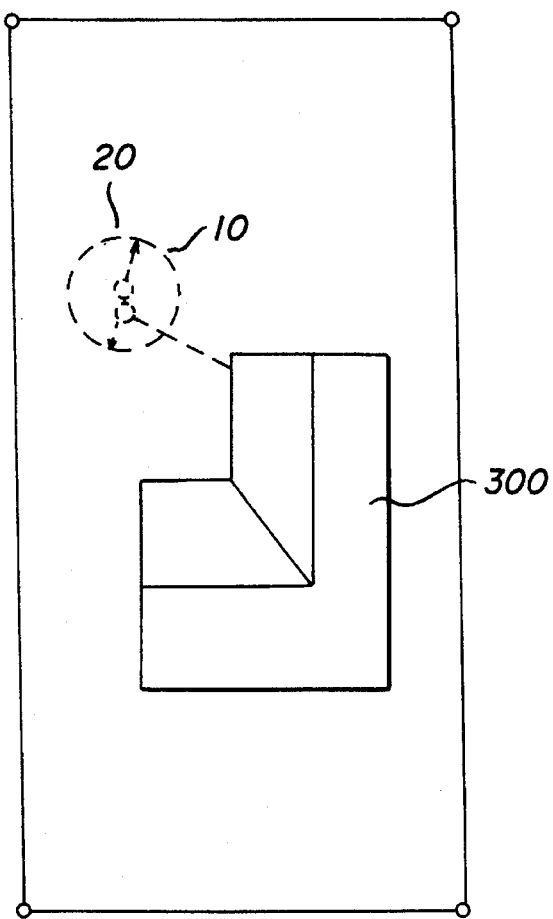
FIG. 2 is a reduced top plan schematic view of the geothermal cell and recovery system invention and house shown in FIG. 1.

The preferred embodiment and best mode of the invention is shown in FIGS. 1–7 and is shown by the figures.

The geothermal cell and recovery system is comprised of two primary components used in connection with a heat exchanger 202 and/or heat pump 200 of a building such as a house 300. One is the geothermal cell assembly 10, and the other is the recovery unit 12.

Figure 4:
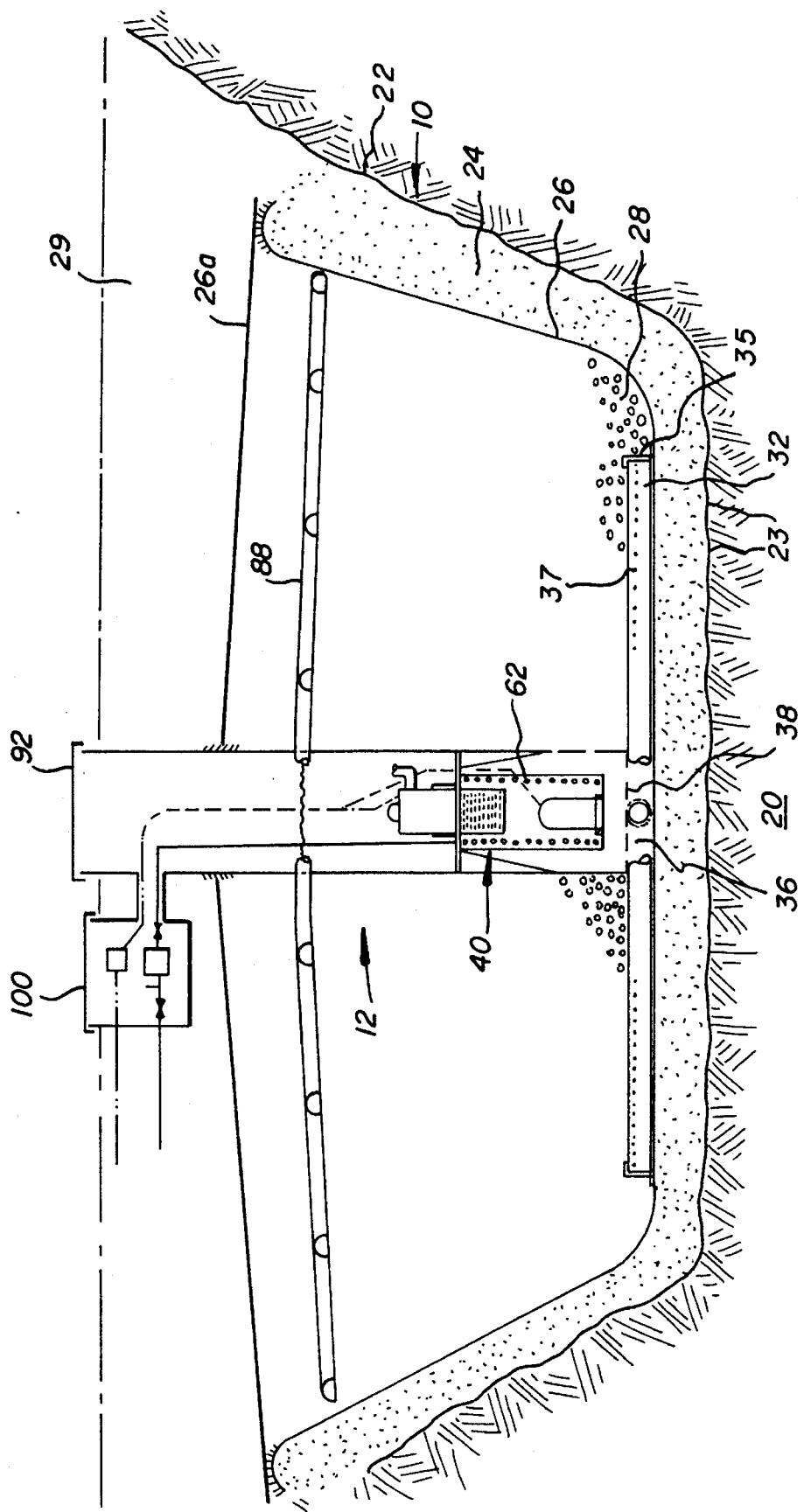
FIG. 4 is an enlarged cross sectional elevational view of the geothermal cell and recovery system and heat sink.

Construction of the geothermal cell assembly 10 begins with the excavation of the earth 20 to form a pit approximately 10 to 15 feet in diameter (12'x20' rectangle) and approximately 8 feet deep. The sides 22 and bottom 23 of the pit are smoothed, contoured and lined with stone-free clay or sand 24 as shown in FIGS. 1 and 4. The clay or sand 24 liner is compacted and smoothed to a uniform surface or contour. If desired the sides and bottom of the pit can be formed with a two layer medium comprising a bentonite clay blanket which is placed over a base sand fill. A polyvinyl barrier 26 of PVC, PVA approximately 50 to 60 mil thickness and having a low insulating 'R' value is placed over the contoured sand/clay 24.

Figure 7:
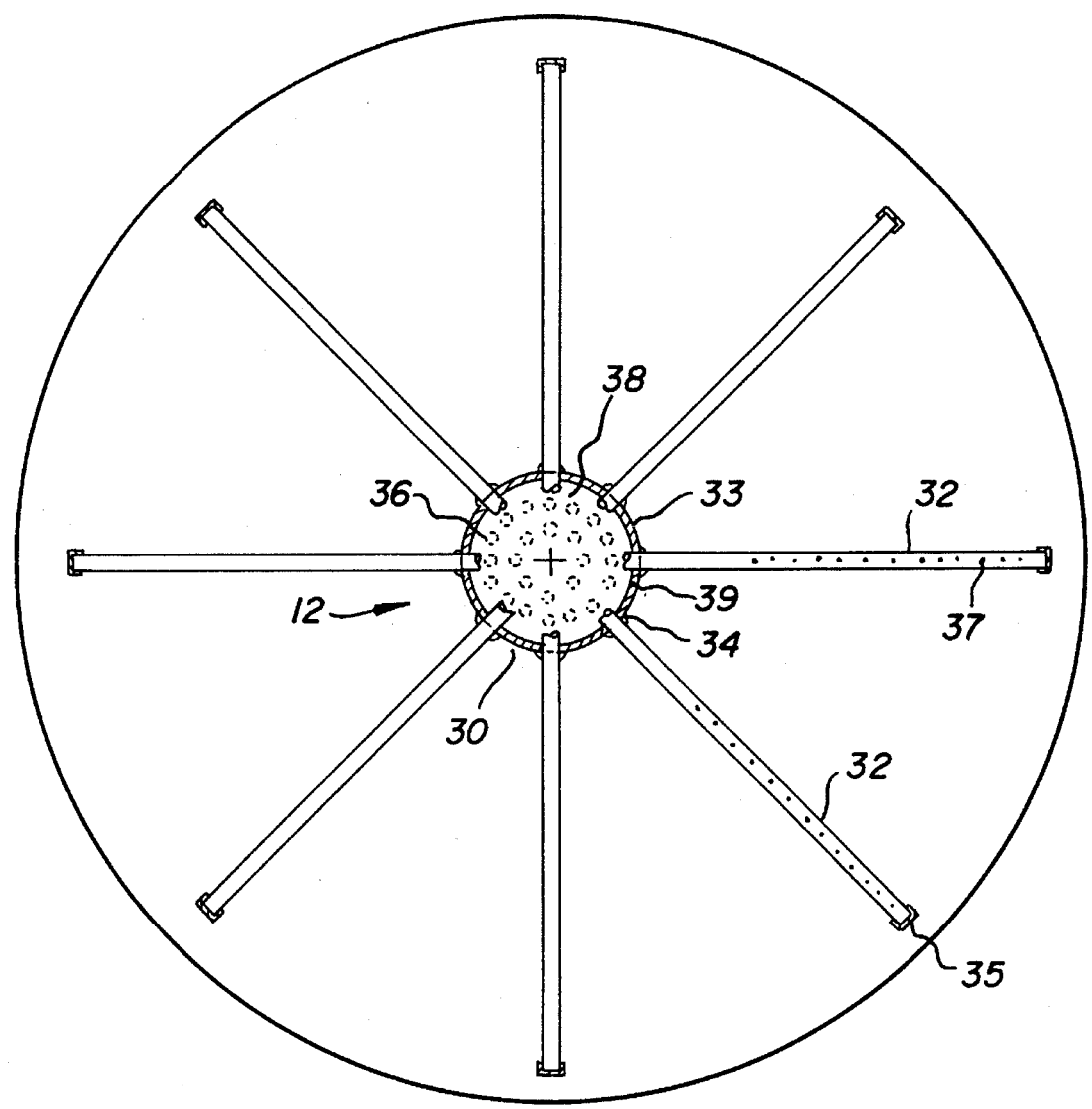
FIG. 7 is a top plan view with housing removed of the recovery assembly of the recovery system.

The recovery assembly 12 is placed on the barrier 26 as shown in FIGS. 1 and 4. A cylindrical support base member 30 which is most clearly shown in FIG. 7 is placed on the top of the barrier 26 and a plurality of perforated recovery pipes 32 are mounted in apertures 34 formed in the side wall 33 of the support base member 30. The open ends of the pipes lead into a chamber 36 in the base member formed by the side wall 33 and a perforated top plate 38. The recovery pipes 32 are sealed in apertures 34 with an expansion foam seal material. Each of the recovery pipes 32 is preferably closed at the distal end with an end closure member 35 and is open at the proximal end which is positioned in chamber 36 so that water collected through the perforations 37 in the pipe body is carried into the chamber 36 and where it circulates upward through the perforated top plate 38 into the stack assembly 40 as will be more fully described. A circular flange support collar 39 is secured by welding, adhesives or heat sealing depending upon the material used on top of the perforated top plate 38 to hold a stack tube assembly 40 in a supported upright position.

Figure 5:
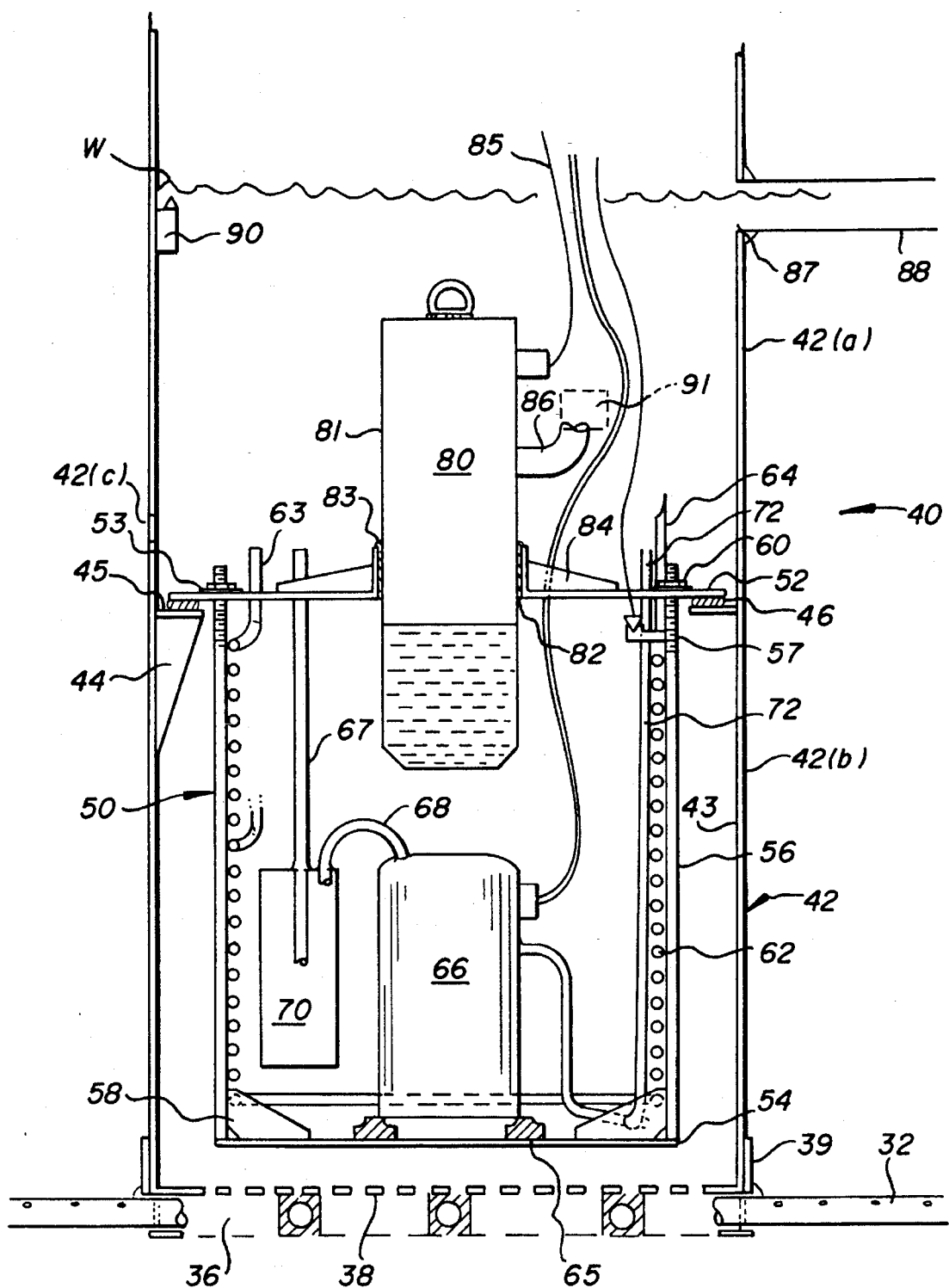
FIG. 5 is an enlarged cross sectional view of the recovery system shown in FIG. 4.

The stack tube assembly 40 is placed on the top surface of the perforated top plate 38 and the base of its cylindrical housing is surrounded by the flange support collar 39 to keep it in a fixed position on the support base member 30. The stack tube assembly cylindrical housing 42 is constructed in two sections 42(a) and 42(b) which are connected together by a slip joint and seal 42(c) as shown in FIG. 5. The housing is preferably constructed of stainless steel or corrosion resistant material to prevent corrosion. Housing section 42(b) has an interior support shelf 44 which is secured to the inner surface 43 of the cylindrical housing. The support shelf 44 may take the form of a plurality of flanges or brackets or a continuous flange. The top surface 45 of the support shelf is provided with a gasket 46 or a bead of hydraulic silicone sealant upon which is mounted the removable recovery assembly 50.

The recovery assembly 50 is constructed with a top plate 52 which sits on gasket 46 or the top surface 45 of the support shelf and a bottom plate 54 which is mounted and supported from the top plate by a plurality of support rods 56. Each support rod 56 has one end welded or secured to the bottom plate 54. The upper section of each support rod 56 is threaded at 57 to receive a nut and washer 60 which keeps the assembly secured together and the top and bottom plates in a predetermined spaced arrangement. The top plate 52 is provided with a plurality of throughgoing apertures through which the threaded end of the rod 56 extends allowing easy threading of the nut. A support bracket 58 is also secured to the support rod 56 and bottom plate 54 to proved additional strength and stability to the structure.

Figure 3:
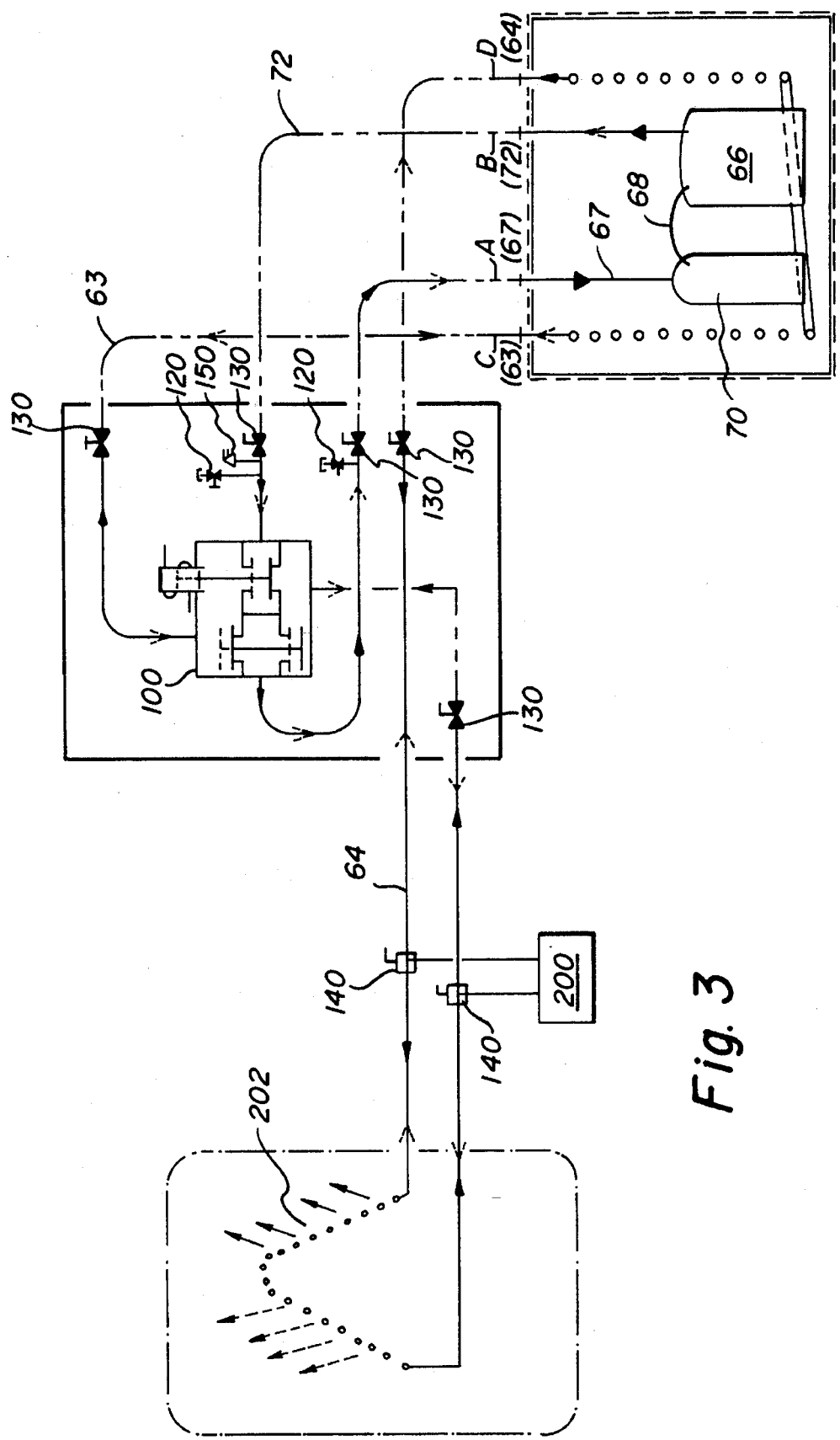
FIG. 3 is a schematic diagram of the fluid flow and fluid controls of the present invention.
Figure 6:
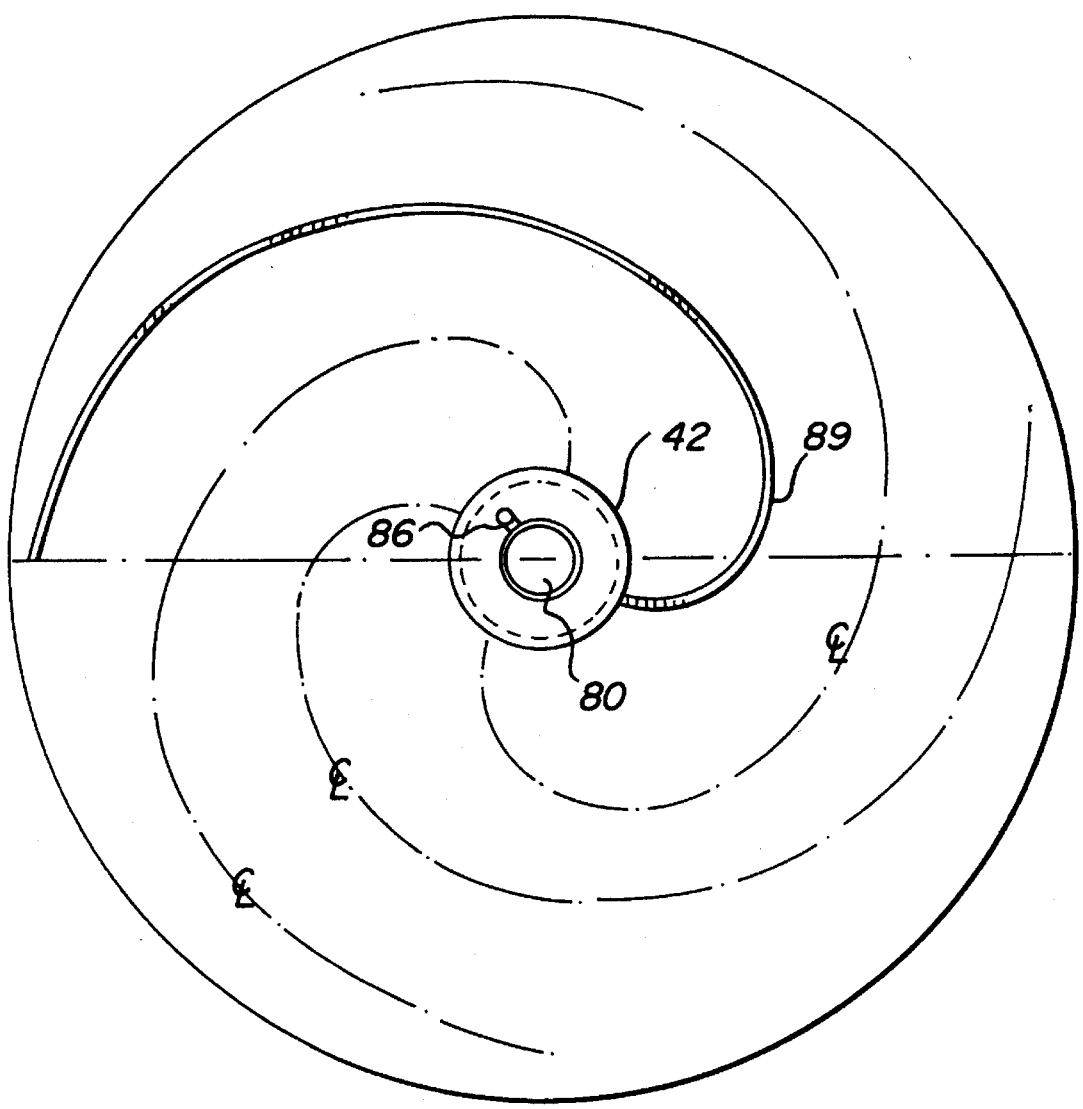
FIG. 6 is a top plan view of the fluid distribution system of the recovery system.

A one piece heat exchanger coil 62 made of copper or stainless steel with lead and exit conduits 63 and 64, also designated in FIG. 3, as C and D is dropped into the recovery assembly prior to mounting of the top plate and is seated on the top planar surface of the support brackets 58 which are secured to the bottom plate. A submersible compressor 66 is seated in the bottom of the recovery assembly on vibration seats 65 secured on the top surface of the bottom plate 54 and has an accumulator tank 70 mounted thereto. As shown in FIGS. 3 and 5 the compressor 66 receives fluid namely refrigerant gas via conduit 67 and a suction conduit 68 which lead respectively into and out of accumulator tank 70. Refrigerant gas leaves accumulator tank 70 via suction conduit 68 into the compressor 66 and is discharged via conduit 72 or B as designated in FIG. 3 into a standard off the shelf reversing valve 100. A submersible pump 80 is mounted in aperture 82 cut in the top plate 52 and is supported on the top plate 52 by a plurality of brackets 84 which are secured to the top surface of the top plate 53. The brackets 84 are secured to the outer surface 81 of the submersible pump 80 by means of a corrosion resistant bolting. A seal is developed through the use of hydraulic silicone sealant 83 placed between the brackets 84 and the outer surface 81 of the pump 80. The submersible pump body surface 81 is coated with a marine epoxy paint and receives water through its base portion and pumps the water out discharge conduit 86 for circulation into water distribution grid assembly 88. A flow verification sensor 91 is attached to pump conduit 86. The water level in the housing is maintained with the level of the water being sensed by sensor 90 mounted to the inner surface of the housing to activate the pump 80 to transport additional water up through the housing. If desired the discharge of the pump can be into a ring distribution head which discharges the water along a plurality of flexible discharge conduits for spiral distribution as seen in FIG. 6 or directly into a grid assembly 88. Power to the pump and compressor 66 are provided in the form of a flexible power and instrumentation cable 85. It should be noted that either the grid assembly 88 or the spiral distribution assembly 89 is mounted after the gravel has been deposited around the stack housing as discussed in the following paragraph.

Rounded stone (commonly called washed river gravel or crushed blue rock) is carefully placed into the geothermal cell and around the stack tube housing 42. Care must be taken not to damage the barrier 26. The river gravel 28 is placed until a depth of 40 to 60 inches is reached or as is specified by design criteria and a slope of 1 inch per foot is developed from the stack tube housing 42 outward. This gravel is used to provide for the water circulation voids between adjacent gravel allowing free flow of water through the cell.

Once the desired amount of river gravel 28 is reached, (still below the rim of the barrier) the distribution spiral assembly is placed on top of the gravel 28, connected to the stack tube, and sealed. The spiral assembly is then covered with additional river gravel until a slope is achieved from the stack tube to the rim. Preferred slope is not less than one-half inch of fall per foot of distance away from the stack tube to the rim of the barrier.

In assembly of the invention, the surface of the barrier 26 is cleaned and free of all dust, dirt, soil, or any other type of contamination. The water recovery assembly and support base 30 is positioned on the barrier 26 and the respective conduits 32 are mounted in apertures 34 of the side wall of the support plate so that the open end of the conduits lead into chamber 36 and the conduits are sealed with a foam sealant of an expansion type. The stack tube assembly 40 is mounted in the cylindrical support flange 39 of the support plate and the stack tube 42(b) with associated hardware is leveled and checked. The section 42(a) is joint sealed to its seated section 42(b) and river gravel is deposited around the stack tube. The distribution assembly 88 is now carefully slid down over the stack tube and placed on top of the river gravel so that it communicates with aperture 87 cut into the stack tube housing. Additional river gravel 28 is deposited and a top barrier 26(a) of the same composition and thickness is placed over the river gravel and secured to the stack tube with a hydraulic silicone sealant.

A cover 92 is placed over the top of the stack tube assembly and the space between the stack tube and cover is also sealed with hydraulic silicone sealant or foam sealant.

Sand or fine clean soil or fill 29 is carefully placed until it reaches the top of the cover 92. The excavation is filled until normal grade level is reached. During this process, power and refrigerant lines (supply and return), and the service box 100 are positioned, placed and attached to the stack tube. Additional fill is placed over the geothermal cell to compensate for settling.

The geothermal cell is then filled with fresh clean water until the level reaches the 'normal level' inside the stack tube which is shown in phantom in FIG. 5 as W. The recovery system (fully assembled) 50 is lowered down the stack tube. Final electrical, refrigerant and control connections are made between the geothermal cell and the user/customer and is ready to operate.

In operation, the geothermal cell and recovery system is connected to a conventional heat pump unit 200 with standard associated controls and/or a convection coil 202. It is also envisioned that the geothermal cell and recovery system can be connected to a swimming pool to heat the pool. The convection coil which is located within the duct work of the building as shown in FIG. 3 is either an existing or a newly placed 'A' coil 202. Heat is absorbed or released by the refrigerant in the 'A' coil as a blower (not shown) which is located in the duct work forces air over the A coil 202. Refrigerant gas, which is circulated through the 'A' coil by means of the submersible compressor 66, changes its state as it passes through the 'A' coil. The refrigerant gas is then moved through copper tubing in the geothermal cell where it again changes physical state.

Within the geothermal cell, refrigerant gas either absorbs from or releases to the water, heat energy (depending upon the desired cycle) as it passes through the recovery unit coil and submersible compressor 66. Water, which is circulated through the discharge conduit 88 by the submersible pump 80, transfers the heat energy to the heat sink and surrounding earth by means of the spiral distribution system or alternative grid which has the same configuration as the receiver grid shown in FIG. 6.

The direction of the refrigerant gas flow between the system components determines the type of heating or cooling cycle to be utilized. As shown in FIG. 3, a refrigerant gas reversing valve 100 is utilized to accomplish this fundamental task. In the schematic of FIG. 3, direction of flow in the cooling cycle is shown by the solid arrows and direction of flow in the heating cycle is shown by the phantom arrows. The fluid transfer conduits are also designated as being flexible lines when broken dotted lines are shown and rigid lines such as copper tubing or suitable equivalents as set forth by the particular local building code when shown by solid lines. Located on the various fluid flow conduits are service valves with caps identified by the numeral 120, isolation ball valves 130 and three way ball valves 140. The three way ball valves 140 allow fluid connection to the conventional heat pump unit 200 and associated controls. The heat pump is any standard purchased heat pump which includes a motor operated compressor, a condenser, a liquid receiver, an expansion valve and an evaporator. Any suitable refrigerant can be employed in compressor 66 such as a number of chlorofluoromethane materials sold under the trademark "Freon". It is also envisioned that ozone friendly refrigerants can be used in place of Freon. A pressure switch 150 is provided in conduit 72 leading from the compressor 66 to maintain a constant pressure feeds from the compressor 66 to the reversing valve.

In the foregoing description, the invention has been described with reference to a particular preferred embodiment, although it is to be understood that specific details shown are merely illustrative, and the invention may be carried out in other ways without departing from the true spirit and scope of the following claims:

What is claimed is:

1. A geothermal cell and recovery system comprising a heat exchange zone located in the earth and separated from the earth by an impermeable barrier, a housing containing a fluid pump and compressor located in said heat exchange zone, fluid conduit return means connected to said housing and positioned in the bottom section of said heat exchange zone, fluid transporting means receiving fluid from said pump means positioned in the top section of said heat exchange zone, a heat exchange assembly mounted in said housing, back-fill material of a size which produces voids deposited around said housing and conduit means leading from said housing to a heat pump means distal from said compressor means.

2. A geothermal cell and recovery system as claimed in claim 1 wherein said heat exchange zone is a pit cut into the earth with a layer of fine material, an impermeable barrier laid on said fine material, and gravel material.

3. A geothermal cell and recovery system as claimed in claim 1 wherein said fluid transporting means comprises fluid receiving conduit means mounted to said housing providing fluid passage from said housing, and said compressor is fluidly connected to said heat exchange assembly, with said fluid pump being mounted to said housing for circulating fluid received from said fluid conduit return means.

4. A geothermal cell and recovery system as claimed in claim 1 wherein said fluid conduit return means comprises a base assembly which forms a seat for said housing, a plurality of perforated conduits mounted to said base assembly and providing fluid communication with said base assembly, said housing being removably mounted to said base assembly.

5. A geothermal cell and recovery system as claimed in claim 4 wherein said fluid pump is mounted in said removable housing.

6. A geothermal cell and recovery system as claimed in claim 1 wherein said compressor is mounted to a removable housing.

7. A geothermal cell and recovery system as claimed in claim 1 including fluid distribution means fluidly connected to said housing, said fluid distribution means comprising at least one pipe assembly mounted to and extending away from said housing to deposit water in said heat exchange zone.

8. A geothermal cell and recovery system as claimed in claim 7 wherein said at least one pipe assembly is a spiral perforated pipe.

9. A geothermal cell and recovery system as claimed in claim 7 wherein said at least one pipe assembly is a plurality of interconnected pipes forming a gird.

10. A geothermal cell and recovery system as claimed in claim 1 wherein fluid conduit return means comprises a base member forming a chamber, a plurality of perforated pipes mounted to said base member and extending away from said base member, said plurality of perforated pipes fluidly communicating with the chamber defined by said base member.

11. A geothermal cell air conditioning assembly comprising a fluid transporting assembly mounted in a pit in the ground, said pit having a continuous side portion and a bottom, a layer of fine grade material lining at least a portion of the surface of said pit, a lining of impermeable material placed over said fine grade material, said fluid transporting assembly including a housing, a compressor mounted in said housing and a heat exchanger coil means mounted in said housing, said housing being positioned above said lining of impermeable material, gravel material placed in said pit around said fluid transporting assembly, an impermeable material mounted over said gravel material, soil filled in over said impervious material and water added to said gravel material between said first impermeable material and second impermeable material.

12. An air conditioner assembly for cooling or heating a conditioned air space comprising; a heat exchange zone, pump means for recycling water located in said heat exchange zone, a housing buried in said heat exchange zone, an underground heat exchanger coil mounted to said housing, said housing being covered with natural geological materials which provide void spaces therebetween, an underground conduit means leading from said heat exchanger coil to a heat exchanger coil located in the duct work of a building, and valve means fluidly connected to said underground conduit means for changing direction of fluid transported along said conduit means to provide for cooling and heating cycles.

13. An assembly as claimed in claim 12 including fluid collection means located near the bottom of said heat exchange zone supporting said housing, said fluid collection means comprising a central base member defining a chamber and a plurality of conduits mounted to said base member and terminating in said chamber, a plurality of said conduits being perforated to receive and carry fluid into said chamber, said conduits extending outward from said central base member.

14. An assembly as claimed in claim 13 wherein said base member comprises a housing with a top plate defining fluid flow means therein and seating means mounted on said top plate.

15. An assembly as claimed in claim 14 wherein said seating means is a flange extending upward from the top plate.

16. An assembly as claimed in claim 12 wherein said heat exchange zone comprises a pit constructed with at least one side wall and a bottom, a layer of fine material placed over the side wall and bottom of said pit, a plastic impermeable liner placed over said side wall and bottom of said pit adjacent said layer of fine material, gravel material of a size to form voids therebetween placed on top of said plastic fluid impermeable liner and a plastic fluid impermeable cover placed over said gravel material.

17. An assembly as claimed in claim 12 wherein said base member defines a seat and said housing is removable from said seat, a removable heat exchange assembly mounted in said housing and a means for mounting said pump means to re-circulate water within said heat exchange zone mounted to said housing.

18. An assembly as claimed in claim 12 including fluid discharge means located near the top portion of said heat exchange zone, said fluid discharge means comprising conduit means mounted to said housing to discharge water into said heat exchange zone for gravity feed to the bottom of said heat exchange zone.

19. An assembly as claimed in claim 18 wherein said conduit means comprises at least one spiral perforated conduit mounted to said housing extending spirally outward from said housing.

20. A geothermal cell and recovery system as claimed in claim 1 wherein said heat pump means includes a convection coil means.

21. A geothermal cell and recovery system as claimed in claim 1 wherein said heat exchange assembly is fluidly connected to conduit means leading to a valve assembly which determines direction of fluid flow in the heating or cooling cycle.

22. A geothermal cell and recovery system comprising a heat exchange zone located in the earth and separated from the earth by an impermeable barrier, a housing containing a fluid pump and compressor located in said heat exchange zone, fluid conduit return means connected to said housing and positioned in the bottom section of said heat exchange zone, fluid transporting means receiving fluid from said pump means positioned in the top section of said heat exchange zone, a heat exchange assembly mounted in said housing, back-fill material of a size which produces voids deposited around said housing and conduit means leading from said housing to a convection coil means distal from said compressor means.

* * * * *